United States Patent
Link

(10) Patent No.: US 6,561,912 B1
(45) Date of Patent: May 13, 2003

(54) DRIVE SHAFT

(75) Inventor: Manfred Link, Waiblingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/477,957

(22) Filed: Jan. 5, 2000

(30) Foreign Application Priority Data

Jan. 8, 1999 (DE) ........................................ 199 00 449

(51) Int. Cl.[7] ................................................. F16C 3/00
(52) U.S. Cl. .................... 464/181; 464/87; 464/182; 403/345
(58) Field of Search ................................ 464/180, 181, 464/182, 183, 87, 88, 902, 903; 403/315, 316, 317, 318, 319, 359.1, 359.5, 360, 345

(56) References Cited

U.S. PATENT DOCUMENTS

| | | | |
|---|---|---|---|
| 2,271,567 A | | 2/1942 | Olson |
| 2,297,619 A | * | 9/1942 | Haberstump .................. 464/87 |
| 2,542,154 A | * | 2/1951 | Mesirow ....................... 464/87 |
| 2,767,527 A | * | 10/1956 | Tocci-Guilbert ............. 464/87 |
| 2,857,749 A | * | 10/1958 | Fabbri et al. ................. 464/88 |
| 2,908,150 A | * | 10/1959 | Stern ............................ 464/88 |
| 2,994,213 A | | 8/1961 | Arnold et al. |
| 3,537,275 A | * | 11/1970 | Smith .......................... 464/87 |
| 3,823,577 A | * | 7/1974 | Smith .......................... 464/88 |
| 4,063,433 A | * | 12/1977 | Chanton ....................... 464/87 |
| 4,411,634 A | * | 10/1983 | Hammelmann ............... 464/88 |
| 5,342,464 A | * | 8/1994 | McIntire et al. ............. 464/182 |
| 5,349,786 A | * | 9/1994 | Dorrah ........................ 451/357 |
| 5,476,421 A | | 12/1995 | Moore et al. |
| 5,601,493 A | * | 2/1997 | Nakazono et al. .......... 464/181 |
| 5,624,990 A | | 4/1997 | Vipperman |
| 5,890,965 A | * | 4/1999 | Deeg et al. .................... 464/88 |

FOREIGN PATENT DOCUMENTS

| | | |
|---|---|---|
| DE | 82 21 412 | 4/1985 |
| DE | 40 09 031 | 9/1991 |
| DE | 195 38 360 | 4/1997 |
| GB | 1 443 599 | 7/1976 |
| JP | 10-331863 | 12/1998 |

* cited by examiner

*Primary Examiner*—Lynne H. Browne
*Assistant Examiner*—Kenn Thompson
(74) *Attorney, Agent, or Firm*—Kenyon & Kenyon

(57) ABSTRACT

A shaft, in particular a drive shaft, for transferring torques, includes a basic member made of an elastic first material, and connecting pieces shaped at their ends for being received by the basic member and prevented by positive engagement from rotating and displacing axially relative to the basic member. The connecting pieces are made of a second material which is inelastic or less-elastic than the first material or. The first and second materials are plastics which are crosslinked with one another at interfaces of the basic member and the connecting parts. The shaft is reliably functional while having a compact design.

1 Claim, 1 Drawing Sheet

DRIVE SHAFT

FIELD OF THE INVENTION

The invention relates to a shaft, and in particular to a drive shaft including a member made of an elastic material and connecting pieces made of a less-elastic or inelastic second material.

RELATED TECHNOLOGY

Especially for the transfer of low torques, a shaft which includes a member made of an elastic material and connecting pieces made of a less-elastic or inelastic second material is intended to make possible compensation for an axial and angular offset between connecting parts.

U.S. Pat. No. 2,271,567 describes a coupling piece made of elastic material, having shaped-in connecting pieces made of inelastic, wear-resistant material. The connectors are rings having undercuts provided for rotation prevention on their respective outer peripheries. These rings are embedded, with axially and radially positive engagement, in the elastic basic member material of the shaft. Because a positive engagement within the elastic basic member material of the shaft is present only on the outer periphery of the rings, the danger exists that rotation of the rings inside the basic member material in the presence of torques to be transferred by the shaft will be insufficiently prevented.

A connecting shaft described in U.S. Pat. No. 2,994,213 has an elastic basic member and shaped-in inelastic connecting pieces, the connecting pieces have a particular shape in order to improve positive engagement. An axially inwardly open annular gap, which is filled by the elastic basic member material, is provided on the outer periphery.

German Patent Document No. 82 21 412 U1 describes a torsion shaft having a configuration of the generic type. Here the connecting pieces are joined by positive engagement to the basic member of the shaft. To enhance the joining strength, the connecting pieces can be adhesively bonded to the basic member.

SUMMARY OF THE INVENTION

An object of the present invention is to provide a shaft that is compact, functions reliably, and can be manufactured efficiently. "Functions reliably" means in particular that even if there is a radially small enclosure of the connector pieces in the elastic basic member material of the shaft, prevention of any rotation of the connector pieces within the shaft basic member is still guaranteed. Axial displaceability of the connector pieces within the shaft basic member material is also to be ruled out with assurance, with minimal material outlay for the basic member. Secure joining of the parts to be joined to one another is at least to require no additional manufacturing effort, but rather to reduce as much as possible that effort that had to be exerted in the case of the existing generic parts.

The present invention therefore provides a shaft, in particular a drive shaft, for transferring torques, having a basic member made of an elastic first plastic material, and connecting pieces, shaped at their ends into the basic member and prevented by positive engagement from rotating and displacing axially, made of a less-elastic or inelastic second plastic material, characterized in that both materials are crosslinked with one another at the interfaces of the parts (1, 2) constituted by them.

The present invention employs the concept of preventing the connector pieces from rotating and displacing within the basic member material of the shaft not only by positive engagement, but also by way of a chemical bond between the materials to be joined together. Plastics which allow chemical bonds of this kind during the production of assembled parts are known.

Thermoplastics, in particular, are suitable.

BRIEF DESCRIPTION OF THE DRAWINGS

An exemplary embodiment that is described in further detail below is depicted in the drawings, in which.

DETAILED DESCRIPTION

Figures 1, 2:
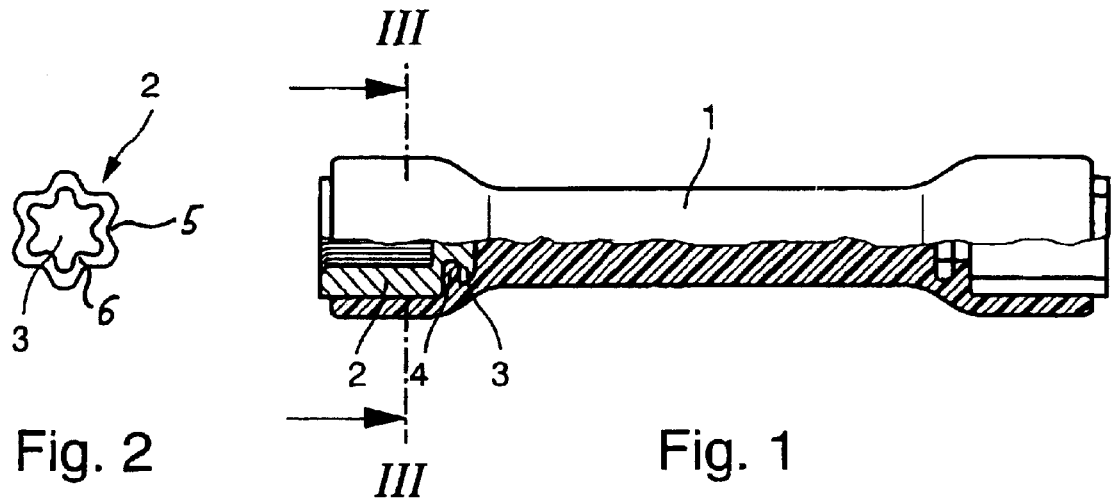
FIG. 1 shows a drive shaft, partially in a view and partially in longitudinal section.
FIG. 2 shows a view of a connecting piece, not yet shaped into the shaft, looking toward the closed bottom which has a mushroom head.
Figure 3:
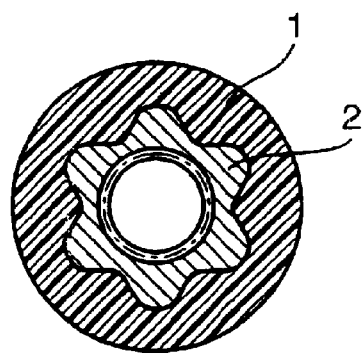
FIG. 3 shows a section through the drive shaft in the region of a connecting piece, along line III—III in FIG. 1.

The exemplary drive shaft that is depicted has a basic member 1 made of a soft, elastic plastic material, and connecting pieces 2, shaped into this basic member 1 at the axial ends, made of a hard plastic material.

The soft plastic material is a plastic referred to as TPO (polypropylene/EPDM, Santoprene 201/73), with a Shore hardness of approximately 70–80. The hard plastic material for connecting pieces 2 can be a plastic referred to as PPGF (polypropylene with a 20 % glass fiber content). Connecting pieces 2 have a cup-like shape, the cups each being equipped on the inside with knurling for nonrotatable joining to connecting parts.

The outer periphery of connecting pieces 2 is of polygonal configuration, with undercuts 5 on their outer circumferential contour, so as thereby to achieve good positive engagement to prevent any rotation of connecting pieces 2 within basic member 1. To prevent stress cracking in the material of basic member 1, the polygonal outer contour should have as few sharp edges as possible.

For axial immobilization of connecting pieces 2 by positive engagement, mushroom heads 3 are shaped onto each of the ends of connecting pieces 2 that face one another. These mushroom heads 3 are each separated by a constriction 4 from the respective closed bottom of the relevant connecting piece 2.

Radially, mushroom heads 3 occupy a smaller space than the remaining region of a connecting piece 2 adjoining the respective constriction 4. As a result, the outside diameter of basic member 1, which is smaller in the axially central portion of the shaft than in the region of connecting pieces 2, can already decrease in the region of mushroom heads 3 from its greater to the smaller value.

Connecting pieces 2 each project slightly out of basic member 1. Mushroom heads 3 have on their outer circumferential contour, like the principal regions of connecting pieces 2, rotation-preventing undercuts 6. Like undercuts 5 on the connecting pieces, these also are each configured with smooth transitions, to prevent stress cracks within the material of basic member 1.

The drive shaft is manufactured in such a way that the materials of basic member 1 and of connecting pieces 2 that come into contact with one another during manufacture enter into a chemical bond, or crosslink, with one another in the contact regions. Corresponding manufacturing methods are known in the existing art. The drive shaft according to the present invention is suitable for safely withstanding large axial and angular offsets over a wide temperature range, with physically small dimensions.

What is claimed is:

1. A shaft for transferring torques comprising:

a first member including an elastic first plastic material, the first member defining an axial and a radial direction; and a first connecting piece and a second connecting piece, each of the first and second connecting pieces having a respective end shaped for reception by the first member, the first and second connecting pieces positively engaging the first member so as to prevent rotation and axial displacement relative to the first member, the first and second connecting pieces including a second plastic material, the second plastic material being inelastic or less elastic than the first plastic material, the first plastic material and the second plastic material included in the first connecting piece being crosslinked with one another at a first interface between the first member and the first connecting piece, the first plastic material and the second plastic material included in the second connecting piece being crosslinked with one another at a second interface between the first member and the second connecting piece;

wherein each of the first and second connecting pieces includes a respective cup opening in a respective axially outward direction and a respective mushroom head formed thereon at the respective end, each cup including a respective closed bottom and a respective side, and wherein each of the first and second connecting pieces defines a respective constriction disposed between the respective mushroom head and the respective cup, each respective constriction disposed axially inside the respective closed bottom and projecting in a respective radially inward direction inside the respective side.

\* \* \* \* \*

UNITED STATES PATENT AND TRADEMARK OFFICE
CERTIFICATE OF CORRECTION

PATENT NO. : 6,561,912 B1
DATED : May 13, 2003
INVENTOR(S) : Manfred Link

It is certified that error appears in the above-identified patent and that said Letters Patent is hereby corrected as shown below:

Title page,
Item [57], ABSTRACT,
Line 8, please delete "or".

Signed and Sealed this

Second Day of December, 2003

JAMES E. ROGAN
*Director of the United States Patent and Trademark Office*